United States Patent [19]

Ducote

[11] Patent Number: 4,751,431
[45] Date of Patent: Jun. 14, 1988

[54] ADAPTER UNIT FOR TRAILER LIGHT SYSTEM

[75] Inventor: James T. Ducote, Dumas, Ark.

[73] Assignee: Cooper Industries, Inc., Houston, Tex.

[21] Appl. No.: 35,744

[22] Filed: Apr. 8, 1987

[51] Int. Cl.[4] .............................................. B60Q 1/02
[52] U.S. Cl. ........................................ 315/77; 315/82; 315/83; 315/191; 307/10 LS; 340/81 R
[58] Field of Search .................... 315/77, 80, 81, 82, 315/83, 191; 340/67, 78, 81 R; 307/10 LS

[56] References Cited

U.S. PATENT DOCUMENTS

| | | | |
|---|---|---|---|
| 3,882,452 | 5/1975 | Stevens | 315/77 |
| 3,883,845 | 5/1975 | Devita | 340/67 |
| 3,896,415 | 7/1975 | Carter | 340/78 |
| 4,006,453 | 2/1977 | Bryant | 340/67 |
| 4,064,413 | 12/1977 | Andersen | 315/77 |

Primary Examiner—David K. Moore
Assistant Examiner—Michael Razavi
Attorney, Agent, or Firm—Fitch, Even, Tabin & Flannery

[57] ABSTRACT

An adapter unit for interfacing the existing brake and turn signal light system of a vehicle with the light system of a trailer. The adapter unit includes a first relay having a single coil and a pair of contacts relatively movable to a closed circuit condition in response to energization of the coil and biased to an open circuit condition. A second relay has a single coil and a pair of contacts also relatively movable to a closed circuit condition in response to energization of its coil and biased to an open circuit condition. The coils are interconnected with the vehicle light system. The contacts are interconnected with the trailer light system and are also connected to the vehicle battery through a different circuit than the one including the turn signal flasher of the vehicle.

11 Claims, 2 Drawing Sheets

ADAPTER UNIT FOR TRAILER LIGHT SYSTEM

The subject invention relates to an electrical adapter for interfacing two electrical lighting systems and, more particularly, to a relay adapter unit for controlling a trailer light system based on operation of a vehicle light system.

BACKGROUND OF THE INVENTION

It is necessary to control the light system of a trailer by the light signal system of the towing vehicle to communicate the intentions of the driver of the towing vehicle to the drivers of following vehicles. Straightforward attempts to control the trailer system such as by wiring corresponding lamps of the trailer and towing vehicle in parallel have severe disadvantages. For example, parallel wiring increases current requiring the replacement of the existing vehicle turn signal flasher with a heavy duty flasher.

Various adapter units have been proposed for interfacing the brake and turn signal system of a vehicle with a trailer system of the type have a brake and turn signal lamp on each side of the trailer. Some include circuitry making use of solid state components, such as silicon controlled rectifiers, which may be susceptible to electrical surges resulting in their unreliable operation. For further information regarding the structure and operation of such an adapter unit, reference may be made to U.S. Pat. No. 4,006,453.

Another proposed adapter unit avoids the surge problem by employing a pair of special bucking type relays the coils of which are interconnected with the vehicle brake and turn signal system, and the contacts of which are interconnected to the trailer lamp system. As the trailer lamp system is served by a different circuit than that including the turn signal flasher, no heavy duty flasher is required. The coil of each relay is made up of two coil portions wound in bucking relationship. One of the coil portions is connected to the turn signal switch while the other coil portion is connected to the brake switch. The coil portions are commonly connected to ground. When only the brake is depressed, first coil portions of the two relays are energized causing closing of the sets of contacts to energize both trailer lamps. With only the left turn signal on, only a second coil portion of a first relay is energized causing the left trailer lamp to flash simultaneously with the vehicle's left stop lamp. However, when both the brake is depressed and the left turn signal is on with the flasher in the "on" portion of its cycle of operation, both coil portions of the first relay are energized. As they are wound in bucking relationship, the magnetic fields produced substantially cancel and the contacts remain open so that the left trailer light is deenergized. However, when the flasher is in the "off" portion of its cycle of operation, the second coil portion of the first relay is deenergized and the energized first coil portion of the first relay can close the contacts. The result is that when both the left turn signal and brake are actuated, the left trailer lamp flashes 180° out of phase with the vehicle turn signal lamp. For further information regarding the structure and operation of this adapter unit, reference can be made to U.S. Pat. No. 4,064,413.

SUMMARY OF THE INVENTION

Among the aspects and features of the present invention may be noted an improved adapter unit for interfacing the existing stop and turn signal light system of a vehicle and the existing light system of a trailer. The adapter unit of the present invention uses only standard relays each having a single coil and is configured so that there is no current through the coil when both the brake is applied and the corresponding turn signal is on. The adapter unit of the present invention avoids the need for a heavy duty flasher, has a minimum of internal and external connections and results in the trailer lamps providing bright visible light. The adapter unit also is relatively light in weight, is dependable in use, has long service life, and is easy and economical to manufacture. Other advantages and features of the adapter unit will be in part apparent and in part pointed out hereinafter in the following specification and accompanying drawings.

Briefly, the adapter unit includes a first relay having a first continuous coil and a first pair of contacts relatively movable to a closed circuit condition in response to energization of the coil and biased to an open circuit condition. The adapter unit also includes a second relay having a second continuous coil and a second pair of contacts relatively movable to a closed circuit condition in response to energization of the second coil and biased to an open circuit condition. The second end of the first coil is connected to the first end of the second coil, and the second contact of the first pair is connected to the first contact of the second pair. The first end of the first coil, the second end of the first coil, the second end of the second coil and the second contact of the first pair of contacts are connected to the vehicle light system. The remaining contacts of the first and second pairs of contacts are connected to the trailer light system.

BRIEF DESCRIPTION OF THE DRAWINGS

Corresponding reference characters indicate corresponding components in the two drawings.

DESCRIPTION OF THE PREFERRED EMBODIMENT

Figure 1:
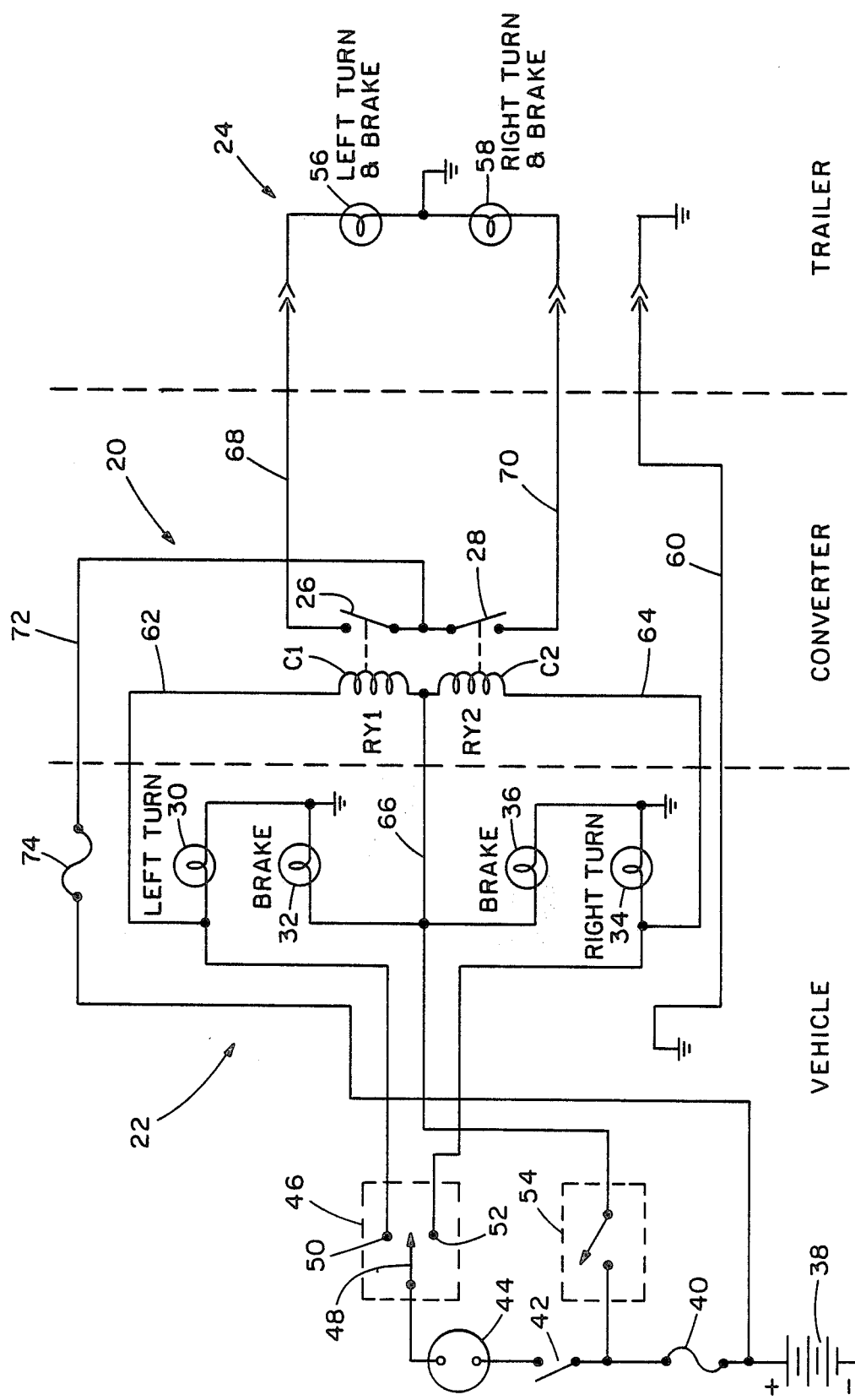
FIG. 1 is a schematic diagram of an adapter unit incorporating various aspects of the present invention interconnected with an exemplary vehicle brake and turn light system and an exemplary trailer light system.

Referring now to FIG. 1 an adapter unit for interfacing a brake and turn signal system 22 of a towing vehicle with a brake and turn light system 24 of a trailer, is generally indicated by reference numeral 20. The adapter unit 20 comprises a pair of standard relays RY1 and RY2 each having a single coil C1 and C2, respectively. Each coil controls the closing of a pair of single pole, single throw normally open contacts 26, 28, respectively. The relays and various leads for enabling connection of the coils and contacts to the vehicle system 22 and the trailer system 24 are preferably mounted on a printed circuit board and a waterproof enclosure is preferably employed to house the various components of the adapter unit.

The vehicle system 22 is illustrated only as an example of such system. As well known to those of skill in the art, there are variations in the components and arrangement of such systems. However, such systems typically include a left turn lamp 30, a left brake lamp 32, a right turn lamp 34 and a right brake lamp 36. The turn lamps 30 and 34 are connected to the vehicle battery 38 through a fuse 40, an ignition switch 42, a standard duty turn signal flasher 44 and a turn signal switch 46 having a movable contact 48 for engagement with either a fixed contact 50 connected to left turn lamp 30 or a fixed contact 52 connected to the right turn lamp 34 and biased to a position, shown in FIG. 1, in which it does not operatively engage either contact 50 or 52. These components are well known to those of skill in the art and need not be further discussed here.

The brake lamps 32 and 36 are connected in a circuit including a brake lamp switch 54, which could be either a limit switch or operate as a result of hydraulic pressure, to indicate application of the brakes of the vehicle. The trailer light system includes a left turn and brake lamp 56 and a right turn and brake lamp 58, both connected to ground. The adapter unit 20 can also include a ground wire 60 for the trailer. A first end of coil C1 is commonly connected to the left turn lamp 30 and turn signal switch contact 50 by a lead 62, the second end of coil C2 is commonly connected to the right turn lamp 34 and turn signal switch contact 52 by a lead 64, and the remaining ends of coils C1 and C2 are commonly connected to the brake switch 54 by a lead 66. The fixed contact of first pair 26 is connected to the left turn and brake lamp 56 by a lead 68, the fixed contact of the second pair 28 is connected to the right turn and brake lamp 58 by a lead 70, and the movable contacts of the contact pairs 26 and 28 are commonly connected to the vehicle battery by a lead 72 through a fuse 74.

Operation of the adapter unit 20 of the present invention is as follows: Upon operation of the vehicle brake, brake lamp switch 54 closes illuminating vehicle brake lamps 32 and 36. The relay coils C1 and C2 are also energized by closure of switch 54 through circuits including the vehicle turn signal lamps 30 and 34, respectively. As the impedance of the coils is about an order of magnitude greater than that of the lamps, the coils close their respective contact pairs causing trailer lamps 56 and 58 to shine brightly without turn signal lamps 30 and 34 lighting. When the left turn signal, for example, is actuated without the brakes being applied, the coil C1 is energized through a circuit including the brake lamps 32 and 36 causing closing of the first contact pair 26 in concert with the "on" portion of the cycle of operation of flasher 44 resulting in in-phase flashing of the vehicle left turn lamp 30 and the trailer left turn and brake lamp 56. As the impedance of the coil C1 is so much greater than that of a lamp, the slight additional current through the flasher 44 does not require its replacement by a heavy duty flasher. The result of the operation of the right turn signal with the brakes not applied is similar to that just described.

If the vehicle brake is depressed at the same time the left turn signal is actuated when the flasher is in the "on" portion of its cycle of operation, 12 volt dc is applied to both sides of coil C1. The coil is deenergized until the flasher goes to the "off" portion of its cycle. At that time the coil C1 is energized through a circuit including the vehicle left turn lamp 30. The result is that the trailer left turn and brake lamp 56 flashes brightly 180 degrees out of phase with the flashing of the left turn lamp 30 of the vehicle. The result of the operation of the right turn signal with the brakes applied similarly results in 180 degree out of phase flashing of the right turn and brake lamp 56 of the trailer system 24 and the right turn lamp 34 of the vehicle system 22. It will be appreciated that the adapter unit can be used with either a positive or negative ground system.

It will be appreciated that adapter unit 20, in essence, forms two exclusive OR gates. If either the brake is applied or the left turn signal is actuated (with the flasher 44 in the "on" portion of its cycle of operation), the left turn and brake lamp 56 is illuminated due to the energization of coil C1 closing contact pair 26. However, if *both* the brake is applied *and* the left turn signal is actuated (with the flasher "on"), there is no potential between the ends of coil C1 and the coil does not energize resulting in lamp 56 being dark.

Figure 2:
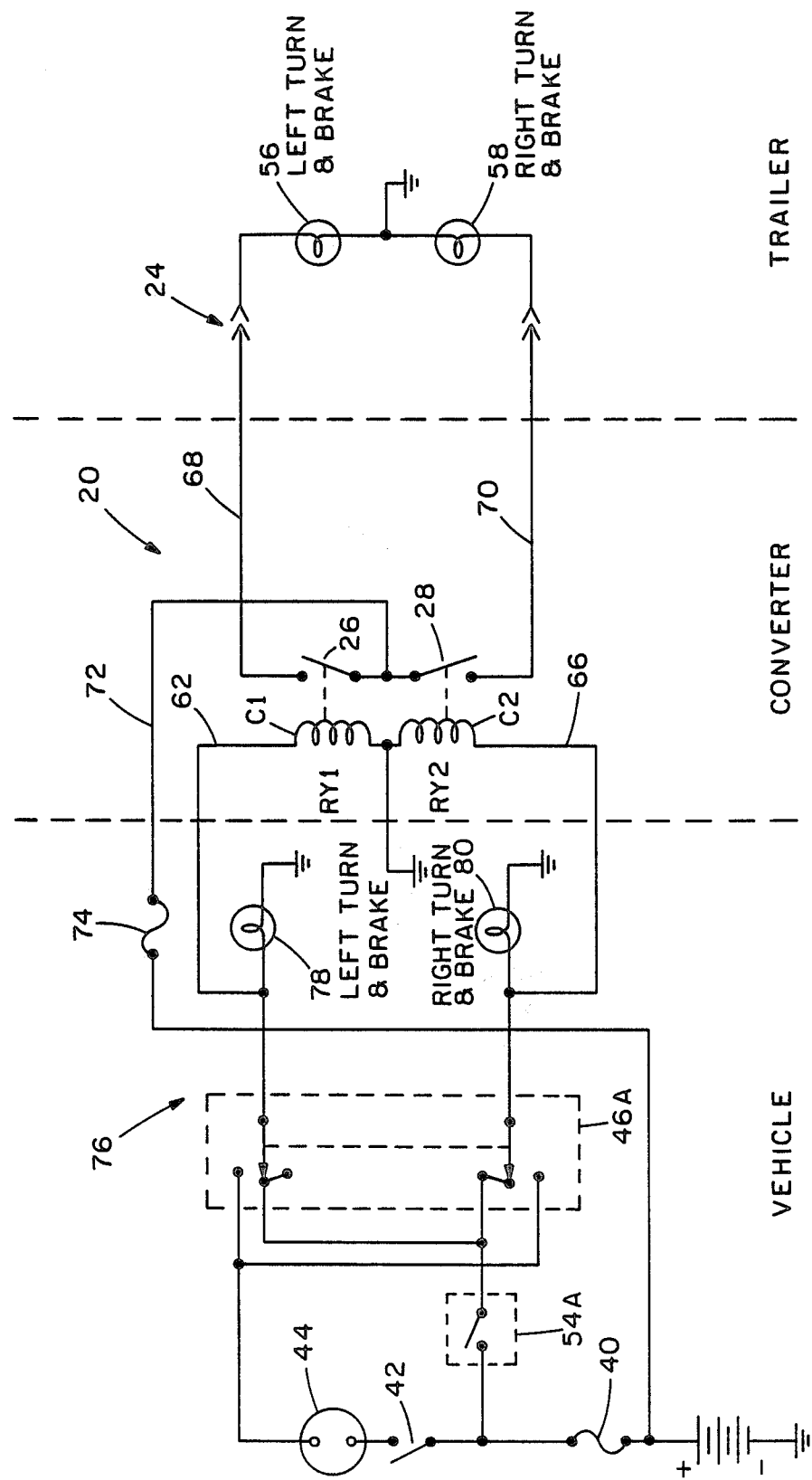
FIG. 2, similar to FIG. 1, shows a different vehicle and brake light system with which the adapter unit of the present invention also can be used.

Referring to FIG. 2, a vehicle turn and brake light system 76 is shown in which, rather than having separate turn and brake lamps on each side as does vehicle system 22, there is a left turn and brake lamp 78 and a right turn and brake lamp 80 (similar to the trailer light system 24). As in system 22, a brake switch 54A used in system 76 is single pole, single throw. However, the turn signal switch 46A used in system 76 is a double pole, triple throw switch. It will be appreciated that the adapter unit 20 also can be used with this vehicle system 76.

The operation of the circuitry of FIG. 2 is as follows: Upon operation of the vehicle brake, brake lamp switch 54A closes causing illumination of all four lamps 78, 80, 56 and 58. When the left turn signal is actuated without the brakes being applied, both left side vehicle lamp 78 and trailer lamp 56 are illuminated during the "on" portion of the cycle of operation of the flasher 44. If the vehicle brake is depressed at the same time the left turn signal is actuated, the vehicle right turn and brake lamp 80 and the trailer right turn and brake lamp 58 stay illuminated while lamps 78 and 56 flash in phase. Thus each lamp of the trailer will light at the same time as its corresponding vehicle lamp. As with the previous vehicle system, the use of adapter unit 20 does not require the turn signal flasher of system 76 be replaced with a heavy duty flasher because the coils of the relays draw relatively little current and because the trailer lamps are served by a circuit not including the flasher. The adapter unit 20 is versatile in that it can be used with either vehicle light system 22 or vehicle light system 76.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. An adapter unit for interfacing the existing brake and turn signal light system of a vehicle having a vehicle ground with the light system of a trailer, the trailer light system including a left turn and brake lamp and a right turn and brake lamp, said vehicle system including a battery, brake switch means, right and left turn signal means, flasher means, brake lamp means, left turn lamp means and right turn lamp means, said adapter unit comprising:

a first relay having a first single coil and a first pair of contacts relatively movable to a closed circuit condition in response to energization of said coil and biased to an open circuit condition, and, a second relay having a second single coil and a second pair of contacts relatively movable to a closed circuit condition in response to energization of said second coil and biased to an open circuit condition, each of said coils having a first end and a second end with the second end of said first coil being connected to the first end of said second coil, each of said pairs of contacts including a first contact and a second contact with the second contact of said first pair being connected to the first contact of said second pair;

the first end of said first coil, the second end of said first coil, the second end of said second coil and the second contact of said first pair of contacts being for connection to said vehicle light system, and the first contact of said first pair of contacts and the second contact of said second pair of contacts being for connection to said trailer light system, neither said first single coil nor said second single coil having provision for direct connection to ground.

2. An adapter as set forth in claim 1 wherein said first end of said first coil is connected to said vehicle left turn lamp means and said turn signal means.

3. An adapter unit as set forth in claim 1 wherein said second end of said first coil is connected to said vehicle brake switch means.

4. An adapter unit as set forth in claim 1 wherein the second end of said second coil is connected to said vehicle right turn lamp means and said turn signal means.

5. An adapter unit as set forth in claim 1 wherein the second contact of said first pair of contacts is connected to said battery.

6. An adapter unit as set forth in claim 1 wherein the first contact of said first pair of contacts is connected to said trailer system left turn and brake lamp.

7. An adapter unit as set forth in claim 1 wherein the second contact of said second pair of contacts is connected to said trailer system right turn and brake lamp.

8. An adapter unit as set forth in claim 1 wherein said vehicle has a system ground and said unit further comprises means for connecting the lamps of said trailer to said ground.

9. An adapter unit as set forth in claim 1 wherein said first coil has an impedance less than that of said left turn lamp means.

10. In combination, a brake and turn signal system of a vehicle having a vehicle ground, a light system of a trailer, and an adapter unit interfacing said systems so that said trailer light system indicates operation of the brake and turn signal of said vehicle; said vehicle system comprising:

a left brake lamp and a right brake lamp connected to a vehicle battery through a brake switch;

a left turn lamp connected to said battery through a turn signal flasher and a turn signal switch; and a right turn lamp connected to said battery through said turn signal flasher and said turn signal switch, said trailer light system comprising:

a left turn and brake lamp connected to ground, and a right turn and brake lamp connected to ground, said adapter unit comprising:

a first relay having a first continuous coil and a first pair of contacts relatively movable to a closed circuit condition in response to energization of said first coil and biased to an open circuit condition, the first end of said first coil being connected to said left turn lamp and said turn signal switch, the second end of said first coil being connected to said brake lamps and said brake switch, the first contact of said first pair being connected to said left turn and brake lamp, and said second contact of said first pair being connected to said battery; and a second relay having a second continuous coil and a second pair of contacts relatively movable to a closed circuit condition in response to energization of said second coil and biased to an open circuit condition, the first end of said second coil being connected to the second end of said first coil, the second end of said second coil being connected to said right turn lamp and to said turn signal switch, the first contact of said second pair being connected to said second contact of said first pair, and said second contact of said second pair being connected to said right turn and brake light, each relay coil having a greater impedance than that of any of the aformentioned vehicle lamps, neither said first coil nor said second coil being directly connected to ground, whereby actuation of said turn signal to indicate a left turn without the vehicle brake applied causes said left turn lamp of the vehicle and the left turn and brake lamp of the trailer to flash together, and actuation of said turn signal to indicate a left turn with the vehicle brake applied causes said left turn lamp to shine only during the "on" portion of the cycle of operation of said flasher and the left turn and brake lamp to shine only during the "off" portion of the cycle of operation of said flasher, substantially no current flowing through said first coil when said brake is applied, said turn signal is actuated to indicate a left turn, and said flasher is in the "on" portion of its cycle of operation.

11. An adapter unit for interfacing the existing brake and turn signal light system of a vehicle having a vehicle ground with the light system of a trailer, said adapter unit comprising:

a first relay having a single coil and a single pair of contacts relatively movable to a closed circuit condition in response to energization of said coil and biased to an open circuit condition;

a second relay having a single coil and a single pair of contacts relatively movable to a closed circuit condition in response to energization of said second relay coil and biased to an open circuit condition, each of said coils having a first end and a second end with the second end of said first relay coil being connected to the first end of said second relay coil, each of said pairs of contacts including a first contact and a second contact with the second contact of said first pair being connected to the first relay contact of said second relay pair;

a first lead connected to the first end of the first relay coil;

a second lead connected to the second end of the first relay coil;

a third lead connected to the second end of the second relay coil;

a fourth lead connected to the second contact of said first relay pair;

a fifth lead connected to the first contact of said first relay pair; and a sixth lead connected to the second contact of said second relay pair, the first through fourth leads being for connection to said light system of a vehicle and said fifth and sixth leads being for connection to the light system of a trailer, said coils having no provision for their direct connection to ground.

* * * * *